United States Patent
Lee et al.

(10) Patent No.: US 6,411,728 B1
(45) Date of Patent: Jun. 25, 2002

(54) ASSOCIATION OF FINGER PORES AND MACROFEATURES FOR IDENTIFICATION OF INDIVIDUALS

(75) Inventors: Jonathan Alexander Lee; Philip Dean Lapsley, both of Oakland; David Ferrin Pare, Jr., Berkeley, all of CA (US)

(73) Assignee: Indivos Corporation, Oakland, CA (US)

( * ) Notice: Subject to any disclaimer, the term of this patent is extended or adjusted under 35 U.S.C. 154(b) by 0 days.

(21) Appl. No.: 09/330,253

(22) Filed: Jun. 10, 1999

Related U.S. Application Data (62) Division of application No. 08/902,151, filed on Jul. 29, 1997, now Pat. No. 5,982,914.

(51) Int. Cl.[7] .................................................. G06K 9/00
(52) U.S. Cl. ...................................................... 382/125
(58) Field of Search ................................. 382/124, 125, 382/115, 116; 356/71

(56) References Cited

U.S. PATENT DOCUMENTS

| | | | |
|---|---|---|---|
| 4,151,512 A | 4/1979 | Riganati | 340/163 |
| 4,208,651 A | 6/1980 | McMahon | 340/146.3 |
| 4,618,988 A | 10/1986 | Schiller | 382/5 |
| 4,696,046 A | 9/1987 | Schiller | 382/5 |
| 4,752,966 A | 6/1988 | Schiller | 382/5 |
| 4,805,223 A | 2/1989 | Denyer | 382/4 |
| 5,054,090 A | 10/1991 | Knight | 382/4 |
| 5,105,467 A | 4/1992 | Kim | 382/4 |
| 5,267,324 A | 11/1993 | Kumagai | 382/4 |
| 5,321,765 A | 6/1994 | Costello | 382/4 |
| 5,493,621 A | 2/1996 | Matsumura | 382/125 |
| 5,572,597 A | 11/1996 | Chang | 382/125 |
| 5,719,950 A * | 2/1998 | Osten et al. | 382/115 |
| 5,982,914 A * | 11/1999 | Lee et al. | 382/124 |
| 5,986,746 A * | 11/1999 | Metz et al. | 356/71 |

OTHER PUBLICATIONS

Automated Systems for Fingerprint Authentication Stosz et al. SPIE, Intn'l. Soc. for Optical Eng. vol. 2277 p. 210–223.

* cited by examiner

*Primary Examiner*—Bhavesh Mehta
(74) *Attorney, Agent, or Firm*—Ali Kamarei (57) ABSTRACT

A method of identifying an individual from examination of their natural physical characteristics is shown. The method comprises obtaining from an individual during a registration process, a fingerprint image having at least one registration pore and at least one registration macrofeature; wherein registration pore data is derived from the registration pores, and registration macrofeature data is derived from the registration macrofeatures. In a bid step, a fingerprint image having at least one bid pore and at least one bid macrofeature is obtained; wherein bid pore data is derived from the bid pores and bid macrofeature data is derived from the bid macrofeatures. Bid associated data is constructed from associating the bid pore data with the bid macrofeature data, and constructing registration associated data derived from associating the registration pore data with the registration macrofeature data. The bid associated data is compared to the registration associated data to produce a correlation score where a successful or failed identification result is produced based on comparison of the correlation score to a predetermined threshold value.

19 Claims, 6 Drawing Sheets

Impostor Bid Fingerprint

Valid Registration Fingerprint

☐ — location of matched pores

Low Coverage Factor of $\frac{2}{59}$ indicates a potential impostor fingerprint

FIG. 7

ASSOCIATION OF FINGER PORES AND MACROFEATURES FOR IDENTIFICATION OF INDIVIDUALS

CROSS-REFERENCE

This application is a divisional application of U.S. patent application Ser. No. 08/902,151, filed Jul. 29, 1997, now U.S. Pat. No. 5,982,914, issued on Nov. 9,1999.

FIELD

This invention relates generally to a method and apparatus for identifying an individual from an examination of their natural physical characteristics, specifically, an examination of finger pores and associated macrofeatures.

BACKGROUND

Credit card and check fraud cost the financial industry billions of dollars every year. The reason is that these financial instruments are used only with a token such as a credit card which acts only to identify the individual's financial accounts Often, only a credit card number stands in the way of the fraud perpetrator.

Although PIN numbers and social security numbers are also used to limit fraud, as is well known, PIN numbers and social security numbers are easily obtained by the fraud perpetrator through various surreptitious methods. In order to prevent these types of fraud, many have proposed the use of biometrics (the use of unique physical characteristics of individuals), to identify an individual, in conjunction with verifying or identifying the individual through a credit card, ATM card, account number, or the like.

The methods for identification of individuals using fingerprints based upon examination of ridge based data are well known and are discussed in references such as patents to Costello (U.S. Pat. No. 5,321,765), Schiller (U.S. Pat. No. 4,752,966) and Kim (U.S. Pat. No. 5,105,467). As described in Schiller, biometric identification of individuals is associated with two types of errors. These errors are widely known in the industry as False Reject (Type I) and False Accept (Type II) errors. False accept errors occur when there are enough similarities between the fingerprints of two individuals that one is mistaken for the other. A false reject error occurs for a variety of reasons, and refers to when an individual is not identified even though the individual is an authorized user registered with the system.

However, identification of individuals through the examination of ridge based data poses problems. One drawback of current fingerprint identification systems is that they have non-zero false accept and false reject rates. In a large scale system capable of handling the approximately 110 million U.S. credit card holders, a biometric identification system with even modest false accept and false reject rates may end up creating more in losses due to mistaken identity than it prevents by eliminating criminal fraud. Improving the false accept rate by only a few percentage points for 110 million users amounts to preventing millions of dollars in losses.

Others have suggested that the underlying cause of false accepts and false rejects is that the amount of data from a fingerprint is too limited for it to be used in a biometric identification system involving large numbers of users. The typical number of minutia points available in a fingerprint is reported to be about 30 to 40. Other biometric technologies have emerged to fill this void. Use of iris biometric data has been touted to increase the number of available data points to about 266 features.

Of the above-mentioned references, all uniformly disregard the presence of pores (also known as sweat pores or finger pores) on fingerprints. Pores are naturally occurring physical characteristics of the skin which exist upon the ridges of the fingerprint. Some, including Schiller, consider pores to be minor holes which should be disregarded in what is otherwise a continuous ridge line structure. A typical finger contains about 50 to 300 pores which can be used as additional sources of features for uniquely identifying an individual.

A reference which recognizes that pore data from fingerprints can be used as a source of information for producing either a failed or successful identification of individuals is a paper entitled *Automated System for Fingerprint Authentication.* (Stosz, et al., SPIE, Vol. 2277, p. 210–223). This reference describes a process for image processing of raw biometric images, including gray scale to binary conversion, skeleton graph processing, thinning, and healing, which are well known in the art.

Stosz also describes a multilevel verification process wherein pore locations and minutia data are used separately to confirm or cross-check the identity of individuals. That is, initially pore locations are matched against pore locations and a correlation score is obtained from the pore matching which results in either a successful or failed identification result. Next, assuming the pore match indicated a successful identification result, minutia points are independently matched to minutia points to verify the identification established by pore matching.

A problem with matching pores by location alone occurs when a finger with a high pore density is presented. Simple tests show that a 50% correlation score between two large sets of randomly located pores is possible when used with a location proximity threshold set to about the length of the maximum pore size. These results indicate that a system which matches pores by location alone will have difficulty discriminating between two fingerprints which both have large numbers of pores.

As suggested by Stosz, a high-resolution scanner of at least 800 DPI or greater is required to accurately resolve pores. However, high-resolution scanners have several disadvantages when compared to low-resolution scanners (500 DPI or less). These disadvantages include capturing only a partial fingerprint image in that a similarly sized sensor at a high resolution resolves a smaller area of the finger being imaged than a low-resolution scanner. This is similar to when a microscope lens is adjusted to a higher magnification. To get around this problem, a larger CCD or CMOS image array can be used, however, this results in a significantly higher cost. Other methods can be incorporated to solve this problem such as a movable scanner head. However, all are cumbersome, expensive, unreliable, or time consuming to use. Additionally, the FBI has adopted a 500 DPI standard for its fingerprint images. Therefore, commercially available scanners meet this FBI standard. Conversely, high resolution scanners are not commercially available. Commercial use of high resolution scanners, especially in arenas which contemplate use by numerous individuals such as commercial transactions at retail points of sale, remains economically unfeasible.

It will be appreciated from the foregoing that there is a need for a method and apparatus that can reduce the false accept rate and false reject rate of a fingerprint identification system using commercially available biometric scanners.

Yet another need is to identify an individual from an examination of their pore and macrofeature information using commercially available fingerprint scanners.

Yet another need is to reduce the number of false accepts resulting from random pore matching, especially for individuals with high pore density.

Yet another need is for a fingerprint identification system which eliminates fraud attributed to impostor fingerprints.

SUMMARY

In view of the many limitations and drawbacks of previous fingerprint identification systems, and in view of the many long-felt needs associated therewith, it is a first general object of the invention to provide a method and apparatus that can reduce the false accept rate and false reject rate of a fingerprint identification system using commercially available biometric scanners.

It is a further object of the present invention to provide a mechanism to identify an individual from an examination of their pore and macrofeature information using commercially available fingerprint scanners.

Yet another object of the invention is to provide a mechanism to reduce the number of false accepts resulting from random pore matching, especially those individuals with high pore density.

Yet another object is to provide a fingerprint identification system which eliminates fraud attributed to impostor fingerprints.

The invention meets these objects by providing a method of identifying an individual from examination of their natural physical characteristics. The method comprises obtaining from an individual during a registration process, a fingerprint image having at least one registration pore and at least one registration macrofeature; wherein registration pore data is derived from the registration pores, and registration macrofeature data is derived from the registration macrofeatures. In a bid step, a fingerprint image having at least one bid pore and at least one bid macrofeature is obtained; wherein bid pore data is derived from the bid pores and bid macrofeature data is derived from the bid macrofeatures. Bid associated data is constructed from associating the bid pore data with the bid macrofeature data, and constructing registration associated data derived from associating the registration pore data with the registration macrofeature data. The bid associated data is compared to the registration associated data to produce a correlation score where a successful or failed identification result is produced based on comparison of the correlation score to a predetermined threshold value.

Additionally, the fingerprint identification system determines whether an object exhibits characteristics of a real human finger, to prevent fraudulent attempts to use the identification system. The method comprises obtaining from an individual during a registration process a finger image containing one or more registration pores; wherein a registration pore count is derived from the number of detected pores. A finger image is obtained during a bid step wherein a bid pore count is derived from the number of detected pores. The bid pore count is compared to the registration pore count to produce a pore count correlation factor to determine if the finger image is a real human finger.

DETAILED DESCRIPTION

Referring to FIGS. 1–4, an embodiment of the invention compares an individual's bid fingerprint associated data against registration fingerprint associated data to determine the identity of the individual. Throughout this specification, the term macrofeature is used to refer to fingerprint ridges, fingerprint minutia, or any naturally occurring physical characteristic of the finger, other than pores. Macrofeatures also include subdermal physical characteristics of the individual such as blood vessels. Fingerprint minutia include ridge bifurcations and ridge endings.

A fingerprint template is an electronic record of various fingerprint features. The template is more compact than the fingerprint image and is also more easily stored, transmitted, and compared. The fingerprint template contains the associated data, and optionally other information about the physical characteristics of the fingerprint, such as fingerprint minutia, ridge classification, or ridge density. The associated data comprises at least one pore/macrofeature list comprising one or more pore/macrofeature records.

The pore/macrofeature list constructed from a finger image acquired from an individual during a registration process is called a registration pore/macrofeature list. The pore/macrofeature list constructed from a bid finger image during the identification process is called a bid pore/macrofeature list.

Figure 1:
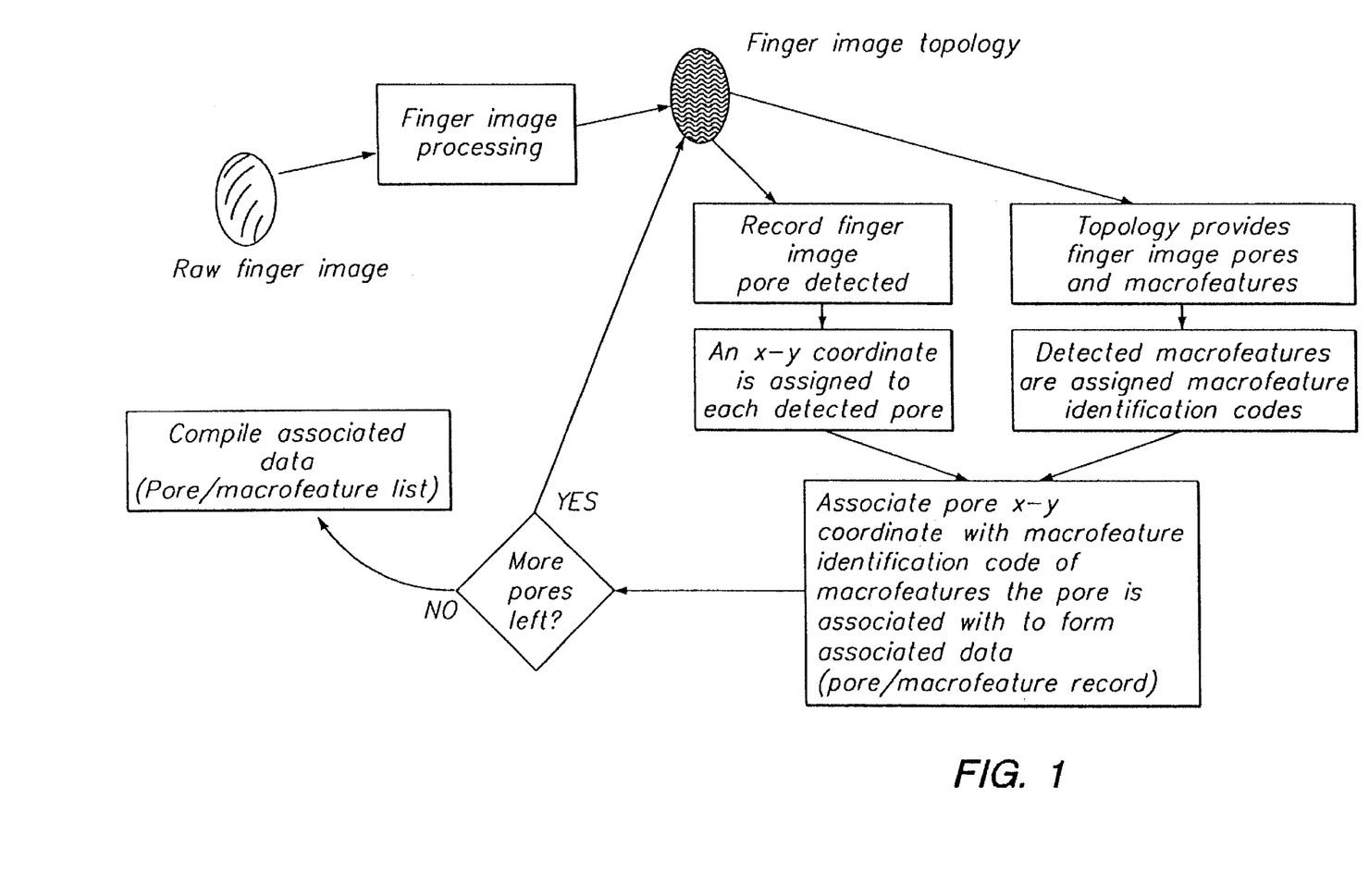
FIG. 1 is a flow chart of a first embodiment of the invention where each pore is associated with an x-y coordinate and a macrofeature identification code.
Figure 2:
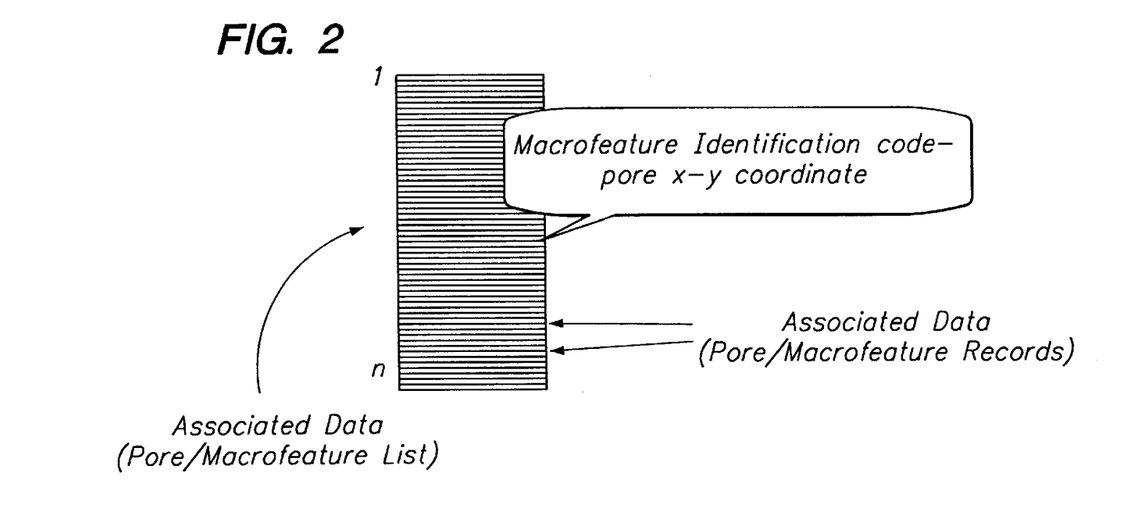
FIG. 2 is a representational diagram of a pore/macrofeature list which holds one or more pore/macrofeature records.
Figure 3:
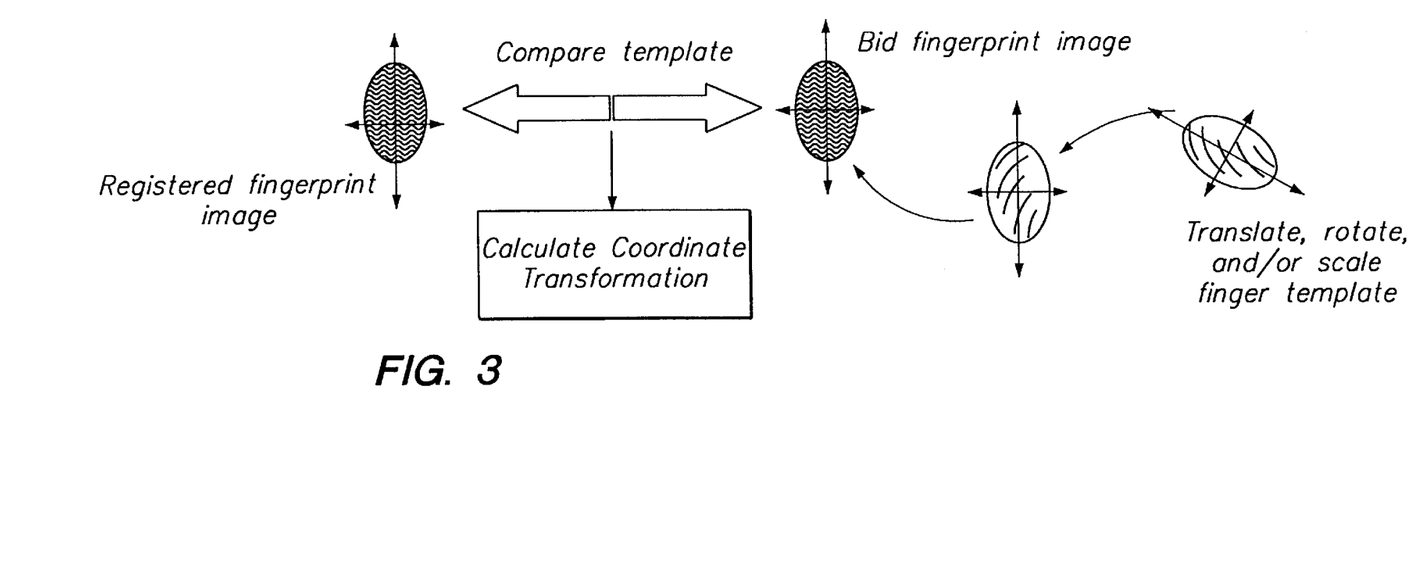
FIG. 3 is a representational diagram of a method for calculating a coordinate transformation.
Figure 4:
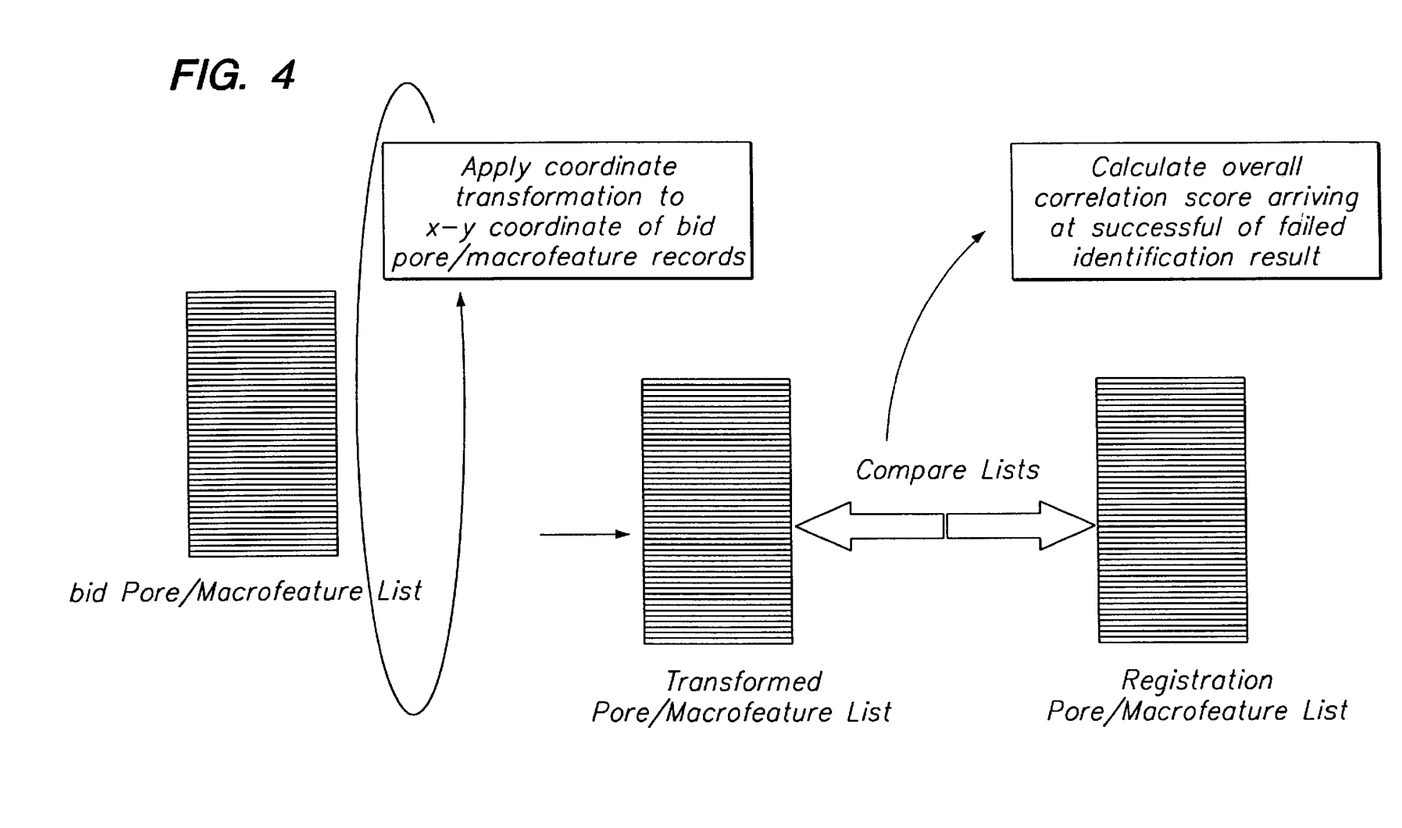
FIG. 4 is a representational diagram showing application of the coordinate transformation to a bid pore/macrofeature list to arrive at a transformed bid pore/macrofeature list, and comparison of the transformed bid pore/macrofeature list to a registered pore/macrofeature list for identification of an individual.

Specifically, FIG. 1 shows the construction of a fingerprint pore/macrofeature list. Initially, registration and bid fingerprints are acquired digitally as gray-scale images. These images can be obtained from a variety of sources including an optically scanned fingerprint card, a prism-based fingerprint sensor, an ultrasound sensor, or a capacitance-based fingerprint sensor. Each fingerprint image is then processed to extract pore and macrofeatures such as ridges. This extraction process consists of several sub-steps: noise reduction, contrast enhancement, binarization, thinning, healing, and feature extraction. Although these extraction processes are well known in the art, they are briefly described below.

The first processing step applies a noise reduction filter to the image to remove errors and other types of noise in the fingerprint image. Many noise reduction methods described in the art are not appropriate for this step because they treat pores as a noise source and hence remove pore information. Suitable noise reduction filters include a simple neighbor averaging filter, a gaussian filter, or/and a multiscale wavelet-based filter. The noise reduction step may not be necessary, depending on the quality of the source for the fingerprint images.

Next, the fingerprint image is optionally contrast enhanced. Contrast enhancement accentuates the pore and ridge structure of the fingerprint image resulting in improved pore detection and extraction. Suitable contrast enhancement filters include the various hysteresis thresholding filters.

After contrast enhancement, the image is binarized. Binarization refers to a process which converts the gray-scale image of a fingerprint into a binary black and white image. A local thresholding filter is suitable for this task.

The binarized fingerprint image is then thinned to produce one-pixel wide fingerprint structures also known as a fingerprint skeleton graph. As is known in the art, either the ridges or the valleys of the fingerprint can be thinned. This produces either a ridge skeleton graph or a valley skeleton graph of the finger. Both forms can be used to extract minutia points. However, pores are more easily extracted from the valley skeleton graph.

Healing refers to the process where noise and other artifacts are removed from the fingerprint skeleton graph. Using various heuristic and structure-based operators, which are well known in the art, structures that would otherwise give rise to false minutia and false pores are removed. Examples of these structures include wrinkles and noise from dirt and oil on the finger surface.

Feature extraction is then performed by locating areas of interest on the fingerprint valley skeleton graph. The areas of interest include the vertices of the valley skeleton graph. Each vertex is examined to determine if it is a minutia point or a pore. Line segments shorter than a maximum pore size (substantially about 250 microns) as well as unconnected vertices (single pixels) are determined to be pores, while all other vertices are considered ridge minutia points. For each pore a pore/macrofeature record containing the x-y coordinate of the pore is added to the pore/macrofeature list. Although an embodiment of the invention uses x-y coordinates to determine pore location, optionally, other coordinate systems such as a polar coordinate system are used. Once the x-y coordinates of the pore locations are extracted from the fingerprint skeleton graph, each detected pore is associated with a corresponding macrofeature.

In an embodiment, the macrofeature is chosen as the ridge which contains the pore. The ridge is determined by first constructing a ridge skeleton graph from the binarized image and the pore x-y coordinate locations are directly matched against the ridge skeleton graph to determine which ridge contains the pore.

In another embodiment of the invention, a ridge skeleton graph is synthesized from the valley skeleton graph by determining the two valleys closest to any given pore. A fingerprint ridge is bounded on either side by a valley. That is, the two valleys closest to a ridge uniquely surround the ridge containing the pore and are termed a valley pair. Therefore, each valley pair represents a ridge or ridge segment on the fingerprint image. By determining the two closest valleys for each pore, the ridge structure can be recovered.

The valley pair for a given pore is determined by searching a bounded area around the pore's location. Out of all of the valleys detected in this area, the two valleys covering the most number of pixels are chosen. In addition, valleys shorter than a certain length are assumed to be wrinkles or noise and are ignored for this calculation.

Each observed ridge, whether synthesized from a valley pair or obtained from the ridge skeleton graph, is given a macrofeature identification code and the pore/macrofeature record for each pore is updated to include the macrofeature identification code which identifies the ridge upon which that pore is located.

In another embodiment, the system associates the linear displacement of a pore from the macrofeature, or angle of displacement of a pore from the macrofeature, and associates this data with the pores. In another embodiment, each macrofeature is chosen by determining the closest minutia point on which the pore shares ridge structure. In another embodiment, the macrofeature is chosen by determining the closest minutia point regardless of which ridge the pore is located on.

Fingerprint Comparison

In the identification process, a bid fingerprint image is obtained from the individual and processed to produce a bid pore/macrofeature list using the same processes used to construct the registration pore/macrofeature list.

The bid pore/macrofeature list is compared to one or more registration pore/macrofeature lists to yield a correlation score indicating the degree of similarity between the bid fingerprint and the registration fingerprint. The resulting correlation scores are then used to rank the probable identity of the individual.

Optionally, a reverse comparison test is utilized in which the registered pore/macrofeature list is compared to the bid pore/macrofeature list. As the algorithm used is a non-symmetrical algorithm, this reverse comparison test yields a different result which is used as either a separate test for identification or used in conjunction with the first comparison test.

The comparison process optionally consists of segmenting the bid fingerprint template into sub-regions which are then matched separately. This compensates for plasticity or non-uniform changes in the surface of the finger. In one embodiment, the fingerprint is segmented by macrofeature. Each segment consists of a single macrofeature or a group of related macrofeatures.

Preferably, a coordinate transformation consisting of coordinate translations, scalings, and/or rotations is applied to each sub-region which is then separately matched against the registration pore/macrofeature list. The coordinate transformation is chosen in such a way as to produce an optimal or near-optimal correlation score. Many such methods used to choose a coordinate transformation are well known in the art including minutia matching and image correlation.

In another embodiment, the apparatus and method next matches the detected pores associated with each macrofeature in the bid pore/macrofeature list to pores in the registration pore/macrofeature list. For a given bid macrofeature, the coordinate-transformed location of each pore associated with that bid macrofeature is compared to the location of every pore in the registration pore/macrofeature list. The pore in the registration pore/macrofeature list that is closest to the location of the coordinate-transformed bid pore and within a specified maximum distance is considered to be the matching pore. A consequence of this is that there may be bid pores that do not match any registration pores. The matched registration pore is associated with a registration macrofeature, and the registration pore/macrofeature list provides this association.

Thus for a given bid macrofeature, each bid pore associated with that bid macrofeature suggests a potential match between that bid macrofeature and one or more registration macrofeatures. A macrofeature correlation score (MFCS) between a given bid macrofeature and a given registration macrofeature is computed as follows:

$$MFCS = \frac{\text{\# of matched registration pores associated with the registration macrofeature}}{\text{\# of pores associated with the bid macrofeature}}$$

For a given bid macrofeature, the registration macrofeature with the highest MFCS is considered to be the best matching registration macrofeature for the bid macrofeature. This value is called the MFCS for the given bid macrofeature.

For example, if all of the matched registration pores indicate the same registration macrofeature, then the macrofeature correlation score would be 1.0 indicating a perfect match. If the bid macrofeature contained four pores, and each pore matched a registration pore on a different macrofeature, then the macrofeature correlation score would be 0.25. If none of the pores on the bid macrofeature matched a registration pore, then the macrofeature correlation score would be zero.

Figure 5A:
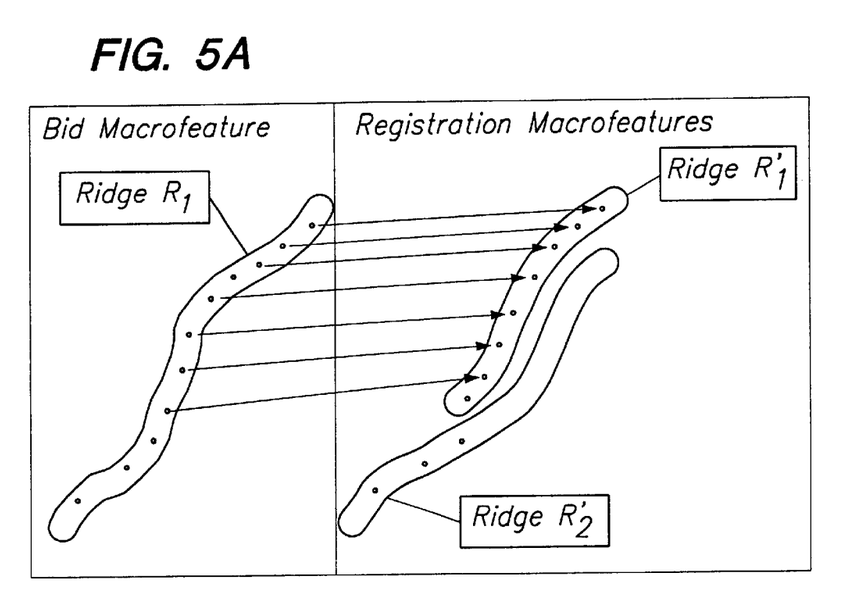
FIGS. 5A and 5B are representational diagrams of a method for calculating macrofeature correlation scores.
Figure 5B:
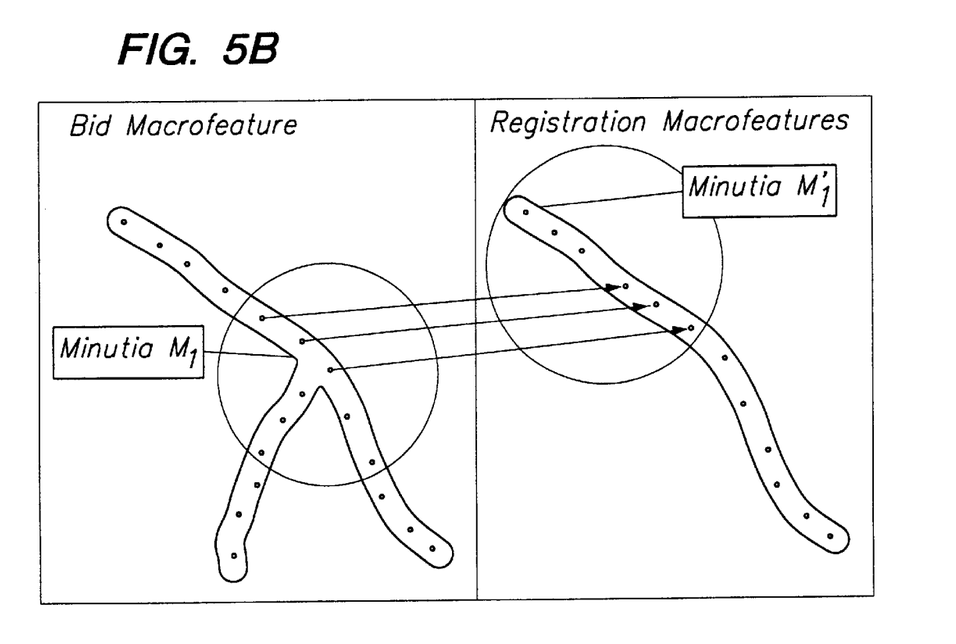

FIGS. 5A and 5B illustrate the calculation of the macrofeature correlation score for a single macrofeature. FIG. 5A shows an example in which the macrofeatures match partially. In this example, the macrofeatures are ridges. Ridge $R_1$ in the bid fingerprint matches ridge $R'_1$ in the registration fingerprint. From the 11 pores on the bid ridge, seven are matched to the pores on the best matching registration ridge, $R'_1$, resulting in an MFCS of 7 divided by 11, or 0.67.

FIG. 5B shows an example of a mismatched macrofeature. In this example, macrofeatures are minutia points, specifically, ridge bifurcations and ridge endings. In the figure, bid minutia point Ml, a bifurcation, is matched with registration minutia point $M'_1$, a ridge ending. Only three pores out of the eight pores associated with the bid minutia point match the pores associated with the registration minutia point $M'_1$. This results in an MFCS of 3 divided by 8, or 0.38.

Although FIGS. 5A and 5B show how MFCS is calculated for mismatched features, they demonstrate the utility of using the macrofeature structures associated with the pore to improve the accuracy of pore matching. For example in FIG. 5A, the three lower pores on bid macrofeature $R_1$ are discounted by the system even though they match the three pores on registration ridge $R'_2$. Conversely, in a system which matches pores independently of macrofeatures, the three pores would mistakenly result in a higher correlation score and potentially result in an erroneous identification of an individual.

After calculating the macrofeature correlation score, an average macrofeature correlation score (AMFCS) is calculated as follows;

$$AMFCS = \frac{\sum_{i=1}^{\text{\# of bid macrofeatures}} MFCS \text{ for bid macrofeature } i}{\text{\# of bid macrofeatures}}$$

The averaging process can optionally weight each macrofeature correlation score by the number of pores associated with the macrofeature so that macrofeatures with more pores are weighted more heavily than macrofeatures with fewer pores. For example, when using a ridge macrofeature, longer ridges with more pores have a more significant impact on the correlation score than shorter ridges with fewer pores.

An overall correlation score (OCS) is then calculated by taking the average ridge correlation score and adjusting it by a coverage factor (CF):

$$OCS = AMFCS \times CF$$

The coverage factor accounts for the difference in pore density between the fingerprint images being compared. A low coverage factor is indicative of fingerprints that have widely different pore densities, and a high coverage factor is indicative of fingerprints that have similar pore densities. In one embodiment, the coverage factor is calculated as a ratio of the number of successfully matched bid pores divided by the total number of registration pores:

$$CF = \frac{\text{\# of matched bid pores}}{\text{\# of registration pores}}$$

Figure 6:
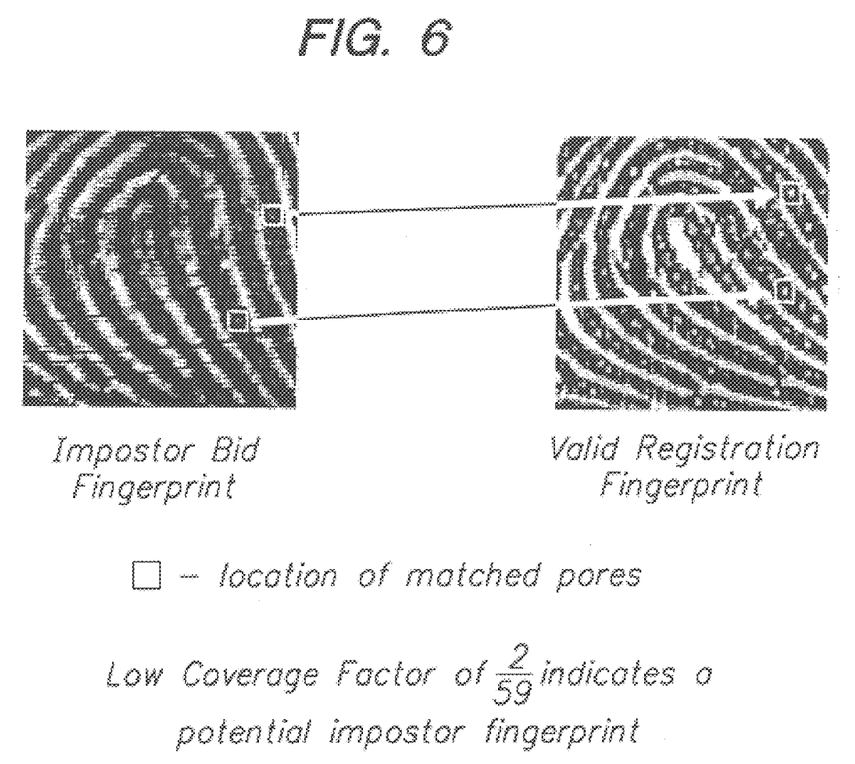
FIG. 6 is a low-resolution image of a bid impostor fingerprint compared to a valid registration fingerprint image and the resulting low coverage factor score indicating a potential impostor fingerprint.

FIG. 6 shows a low resolution image of an impostor fingerprint as compared to a valid registration fingerprint. Although two of the pores on the impostor fingerprint match two of the pores on the registration fingerprint, the registration fingerprint has 59 detected pores. The calculated coverage factor for this comparison is 2 divided by 59, or approximately 0.03. Such a low coverage factor would weigh heavily in rejecting an impostor finger image that would otherwise have macrofeature information that is acceptably similar to the registration fingerprint.

The overall correlation score is then compared to a predetermined threshold value to determine whether or not the bid fingerprint is successfully identified as an individual registered with the system. The association of a finger pore with a particular macrofeature in conjunction with the location of each pore increases the reliability of each pore match over disjunctive matching of pore location and minutia matching.

Experiments and Results

Having disclosed the various embodiments of the invention, the following experiments are provided by way of illustration only and are not intended to limit the invention.

Experiment No. 1

Figure 7:
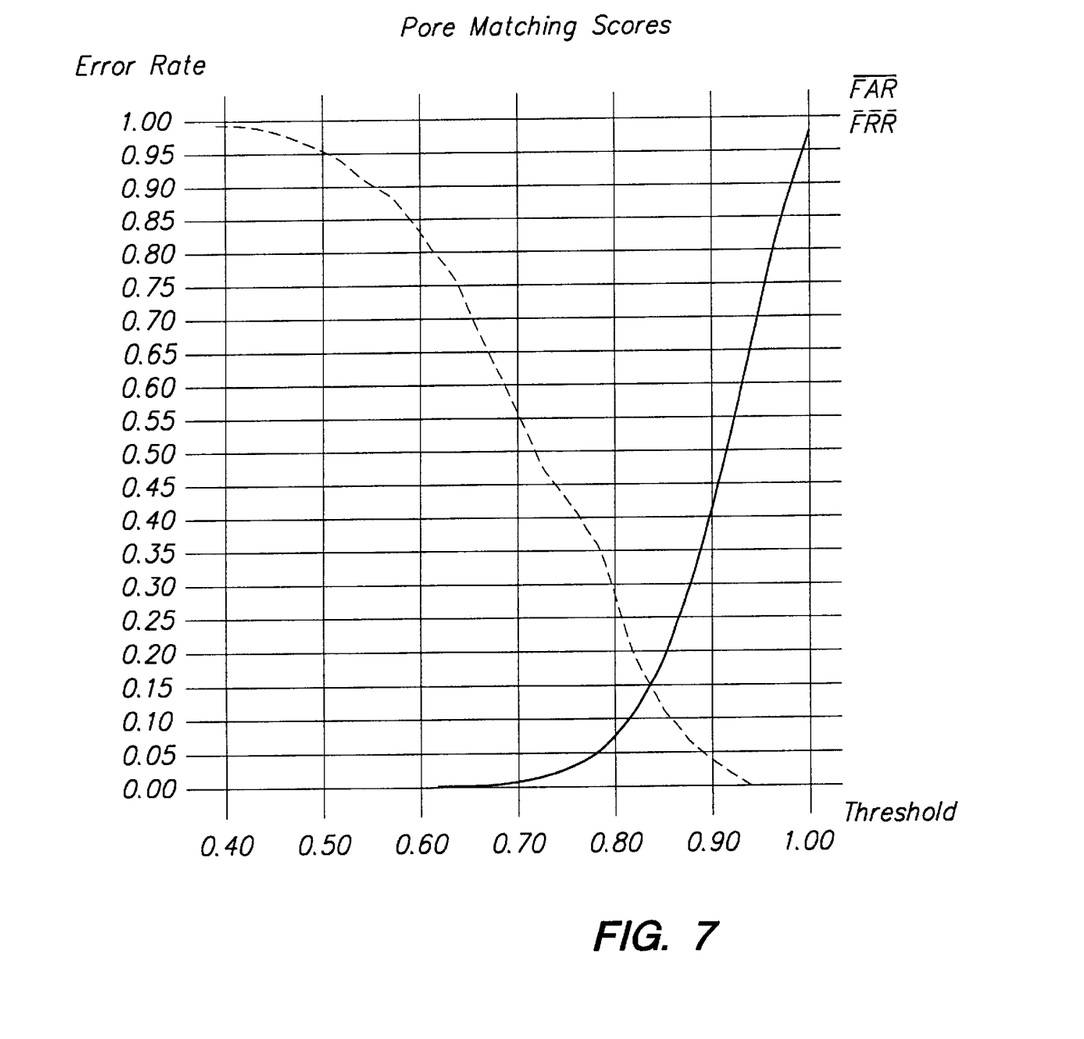
FIG. 7 shows the False Accept and False Reject rate curves for generated error scores.

The fingerprint identification mechanism and device was tested on a database of 104 matched fingerprint pairs. A matched fingerprint pair refers to two separate images of the same finger. The fingerprints were acquired using a commercially available 500 DPI resolution scanner. A comparison was performed on each combination of fingerprint images to generate an error score (error score is calculated as 1 minus the correlation score). FIG. 7 shows the false accept rate (FAR) and the false reject rate (FRR) curves for the generated error scores. The vertical axis of FIG. 7 indicates the percentage of tests that generated a false accept or false reject for a given error score threshold marked on the horizontal axis.

A common measure of system performance is the equal error rate. The equal error rate is determined by the intersection of the FAR and FRR curves. The equal error rate is where the probability or rate of a false accept equals the probability or rate of a false reject. FIG. 7 shows that tests run by applicant's invention produced an equal error rate of 15%. In comparison, Stosz produced an equal error rate of about 12%. It is a surprising advantage of applicant's invention that applicant received comparable results to that of Stosz given that applicant's scanner was of significantly lower resolution than the scanner resolution required by Stosz, and had 2.5 times less resolution than the scanner actually used by Stosz.

Experiment No. 2

The fraud fighting capabilities of the invention were tested by including two matched pairs of "false fingerprints"

acquired from silicone and latex castings of actual fingerprints. The impostor fingerprints taken from individuals display the same ridge and valley macrofeatures as an actual finger, however, they lack the ability to retain significant pore information, and therefore do not display the pore characteristics of the actual fingerprints.

In experiments conducted by applicant and others, impostor fingerprints have consistently fooled commercial fingerprint identification systems which use only macrofeatures, e.g. minutia data or ridge structure, to identify individuals.

Two impostor fingerprints were obtained from individuals who were registered with the identification system of the invention to simulate surreptitious theft of an individual's fingerprint. These impostor fingerprints were presented to the system in order to defraud the system. The impostor fingerprints were compared to each valid fingerprint and in all cases the invention did not match the impostor fingerprints to valid fingerprints. By comparing a bid pore count to a registration pore count, a pore count correlation factor is produced to determine if the finger image is a real human finger.

It will now be apparent that the measures proposed herein have new and unexpected effectiveness in the identification of individuals using pore/macrofeature data. It should be noted that while certain specific embodiments have been described, changes and modifications may be made in view of the general teachings herein which are within the scope of the invention embodied in the following claims.

What is claimed is:

1. A method of identifying an individual from examination of their natural physical characteristics, the method comprising:
   a. obtaining from an individual during a registration process, a fingerprint image having at least one registration pore and at least one registration macrofeature; wherein registration pore data is derived from the registration pores, and registration macrofeature data is derived from the registration macrofeatures;
   b. obtaining from an individual during a bid step, a fingerprint image having at least one bid pore and at least one bid macrofeature; wherein bid pore data is derived from the bid pores and bid macrofeature data is derived from the bid macrofeatures;
   c. constructing bid associated data derived from associating the bid pore data with the bid macrofeature data, and constructing registration associated data derived from associating the registration pore data with the registration macrofeature data;
   d. comparing the bid associated data to the registration associated data to produce a correlation score; arriving at a successful or failed identification result based on comparison of the correlation score to a predetermined threshold value.

2. The method of claim 1 wherein the bid associated data is constructed from associating information relating to each bid pore's location and the particular bid fingerprint ridge on which the bid pore is located.

3. The method of claim 2 wherein the bid fingerprint ridge is synthesized from a pair of valleys closest to the bid pore.

4. The method of claim 2 wherein the bid fingerprint ridge is assigned a macrofeature identification code.

5. The method of claim 1 wherein the registration associated data is constructed from associating information relating to each registration pore's location and the particular registration fingerprint ridge on which the registration pore is located.

6. The method of claim 5 wherein the registration fingerprint ridge is synthesized from a pair of valleys closest to the registration pore.

7. The method of claim 5 wherein the registration fingerprint ridge is assigned a macrofeature identification code.

8. The method of claim 1 wherein the bid associated data is constructed from associating information relating to each bid pore's location and a bid fingerprint minutia point.

9. The method of claim 8 wherein the location of the bid pore is associated with the linear displacement of the bid pore from the bid minutia point.

10. The method of claim 8 wherein the location of the bid pore is associated with the angle of displacement of the bid pore from the bid minutia point.

11. The method of claim 8 wherein the location of the bid pore is associated with the closest bid minutia point with which the bid pore shares ridge structure.

12. The method of claim 1 wherein the registration associated data is constructed from associating information relating to each registration pore's location and a registration fingerprint minutia point.

13. The method of claim 12 wherein the location of the registration pore is associated with the linear displacement of the registration pore from the registration minutia point.

14. The method of claim 12 wherein the location of the registration pore is associated with the angle of displacement of the registration pore from the registration minutia point.

15. The method of claim 12 wherein the location of the registration pore is associated with the closest registration minutia point with which the registration pore shares ridge structure.

16. The method of claim 1 wherein pore density of the bid biometric finger image is compared to pore density of the registered finger image to determine the identity of the individual.

17. A method of identifying an individual from examination of their natural physical characteristics, the method comprising:
   a. obtaining from an individual during a registration process, a fingerprint image having at least one registration pore and at least one registration macrofeature; wherein registration pore data is derived from the registration pores, and registration macrofeature data is derived from the registration macrofeatures;
   b. obtaining from an individual during a bid step, a fingerprint image having at least one bid pore and at least one bid macrofeature; wherein bid pore data is derived from the bid pores and bid macrofeature data is derived from the bid macrofeatures;
   c. constructing bid associated data derived from associating the bid pore data with the bid macrofeature data, and constructing registration associated data derived from associating the registration pore data with the registration macrofeature data, wherein the bid associated data is constructed from associating information relating to each bid pore's location and the particular bid fingerprint ridge on which the bid pore is located; and
   d. comparing the bid associated data to the registration associated data to produce a correlation score; arriving at a successful or failed identification result based on comparison of the correlation score to a predetermined threshold value.

18. The method of claim 17 wherein the bid fingerprint ridge is synthesized from a pair of valleys closest to the bid pore.

19. A method of identifying an individual from examination of their natural physical characteristics, the method comprising:

a. obtaining from an individual during a registration process, a fingerprint image having at least one registration pore and at least one registration macrofeature; wherein registration pore data is derived from the registration pores, and registration macrofeature data is derived from the registration macrofeatures;

b. obtaining from an individual during a bid step, a fingerprint image having at least one bid pore and at least one bid macrofeature; wherein bid pore data is derived from the bid pores and bid macrofeature data is derived from the bid macrofeatures;

c. constructing bid associated data derived from associating the bid pore data with the bid macrofeature data, and constructing registration associated data derived from associating the registration pore data with the registration macrofeature data, wherein the registration associated data is constructed from associating information relating to each registration pore's location and a registration fingerprint minutia point;

d. comparing the bid associated data to the registration associated data to produce a correlation score; arriving at a successful or failed identification result based on comparison of the correlation score to a predetermined threshold value.

\* \* \* \* \*